(12) United States Patent
Choi et al.

(10) Patent No.: US 10,936,129 B2
(45) Date of Patent: Mar. 2, 2021

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); Min Hyuk Park, Gangwon-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/030,395

(22) Filed: Jul. 9, 2018

(65) Prior Publication Data

US 2019/0018518 A1    Jan. 17, 2019

(30) Foreign Application Priority Data

Jul. 11, 2017  (KR) .................. 10-2017-0087532

(51) Int. Cl.
*G06F 3/041*    (2006.01)
*G06F 3/044*    (2006.01)

(52) U.S. Cl.
CPC .......... *G06F 3/0443* (2019.05); *G06F 3/0446* (2019.05); *G06F 3/0448* (2019.05); *G06F 2203/04102* (2013.01); *G06F 2203/04111* (2013.01); *G06F 2203/04112* (2013.01)

(58) Field of Classification Search
CPC .................. G06F 3/041; G06F 3/044
See application file for complete search history.

(56) References Cited

U.S. PATENT DOCUMENTS

| | | | |
|---|---|---|---|
| 2011/0007011 A1* | 1/2011 | Mozdzyn | G06F 3/044 345/173 |
| 2013/0201348 A1* | 8/2013 | Li | G06F 3/044 348/174 |
| 2013/0341070 A1* | 12/2013 | Kim | H05K 1/0213 174/250 |
| 2014/0160374 A1* | 6/2014 | Wang | G06F 3/044 349/12 |
| 2016/0246405 A1* | 8/2016 | Hu | G06F 3/044 |
| 2016/0370916 A1* | 12/2016 | Hashimoto | G06F 3/044 |
| 2017/0108964 A1* | 4/2017 | Sato | G06F 3/044 |
| 2017/0168608 A1* | 6/2017 | Kim | G06F 3/0412 |
| 2017/0177120 A1* | 6/2017 | Kyutoku | G06F 3/041 |

(Continued)

FOREIGN PATENT DOCUMENTS

KR    10-2013-0072591 A    7/2013
KR    10-2014-0092366 A    7/2014

(Continued)

*Primary Examiner* — Chanh D Nguyen
*Assistant Examiner* — Nguyen H Truong
(74) *Attorney, Agent, or Firm* — The PL Law Group, PLLC

(57) ABSTRACT

A touch sensor includes a substrate layer, first sensing electrodes arranged on the substrate layer along a first direction parallel to a top surface of the substrate layer, the first sensing electrodes including first slits therein, second sensing electrodes arranged on the substrate layer along a second direction parallel to a top surface of the substrate layer and crossing the first direction, the second sensing electrodes including second slits therein, bridge electrodes electrically connecting neighboring ones of the first sensing electrodes, and connecting portions which connect neighboring ones of the second sensing electrodes.

10 Claims, 12 Drawing Sheets

(56) References Cited

U.S. PATENT DOCUMENTS

| | | | | |
|---|---|---|---|---|
| 2017/0199608 A1* | 7/2017 | Jung | ............... | G06F 3/0412 |
| 2017/0212629 A1* | 7/2017 | Cho | ............... | G06F 3/044 |
| 2017/0228090 A1* | 8/2017 | Nakamura | ............... | G06F 3/044 |
| 2017/0269728 A1* | 9/2017 | Donnelly | ............... | G06F 3/044 |
| 2018/0059837 A1* | 3/2018 | Kim | ............... | G06F 3/0448 |

FOREIGN PATENT DOCUMENTS

| KR | 10-2015-0068064 A | 6/2015 |
|---|---|---|
| KR | 10-1572432 B1 | 11/2015 |

* cited by examiner

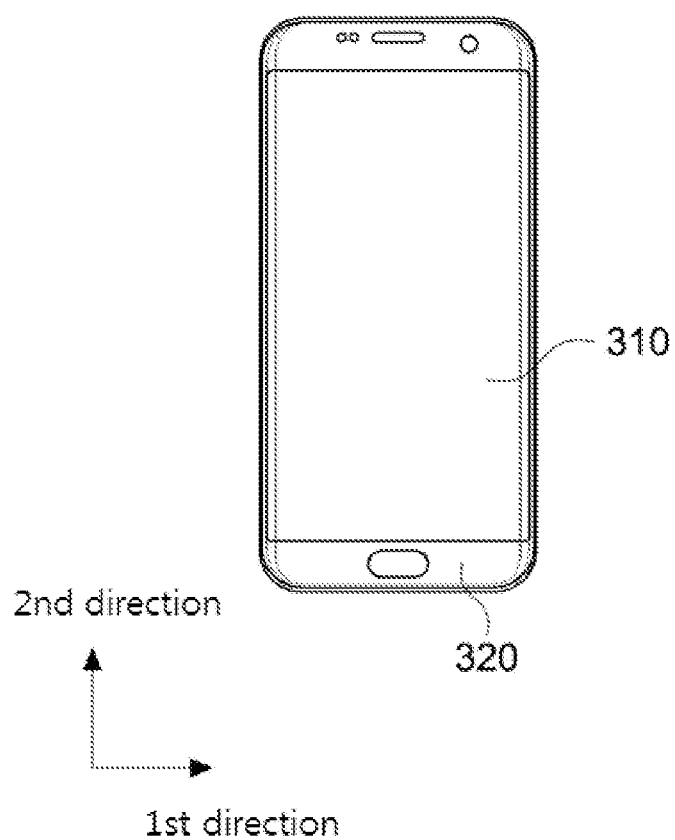

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2017-0087532 filed on Jul. 11, 2017 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a patterned sensing electrode, and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

As a resolution of the display device become increased to a QHD (Quad High Definition) level or a UHD (Ultra High Definition) level, a high resolution is also required in the touch sensor. Thus, a reduction of an optical interference from a sensing electrode included in the touch sensor is needed.

Further, as the display device has become thinner, a flexible display device having a bending or folding property is being developed. Thus, the touch sensor having the flexible property is also required to be employed to the flexible display device. For example, improved durability of the touch panel may be needed so that damages and cracks of electrodes or wirings may be prevented when being folded.

For example, Korean Patent Publication No. 2014-0092366 discloses an image display device combined with a touch screen panel including a touch sensor. However, demands of a thin touch sensor or touch panel having improved mechanical and optical properties are still increasing.

SUMMARY

According to an aspect of the present invention, there is provided a touch sensor having improved optical, electrical and mechanical properties.

According to an aspect of the present invention, there is provided an image display device including a touch sensor having improved optical, electrical and mechanical properties.

The above aspects of the present inventive concepts will be achieved by the following features or constructions:

(1) A touch sensor, including a substrate layer; first sensing electrodes arranged on the substrate layer along a first direction parallel to a top surface of the substrate layer, the first sensing electrodes including first slits therein; second sensing electrodes arranged on the substrate layer along a second direction parallel to a top surface of the substrate layer and crossing the first direction, the second sensing electrodes including second slits therein; bridge electrodes electrically connecting neighboring ones of the first sensing electrodes; and connecting portions which connect neighboring ones of the second sensing electrodes.

(2) The touch sensor according to the above (1), wherein at least one of the bridge electrode or the connecting portion has a solid conductive pattern structure.

(3) The touch sensor according to the above (2), further including an insulation layer covering the connecting portion, wherein the bridge electrode is disposed on the insulation layer.

(4) The touch sensor according to the above (3), wherein the connecting portions are integrally connected to the second sensing electrodes at the same level.

(5) The touch sensor according to the above (1), wherein the first sensing electrode includes first line patterns extending in the first direction, and first connecting blocks connecting neighboring ones of the first line patterns, wherein the second sensing electrode includes second line patterns extending in the second direction, and second connecting blocks connecting neighboring ones of the second line patterns.

(6) The touch sensor according to the above (5), wherein a length in the second direction is greater than a length in the first direction, and a width of the second line pattern is greater than a width of the first line pattern.

(7) The touch sensor according to the above (5), wherein a length in the second direction is greater than a length in the first direction, and a length of the second slit in a long side direction thereof is smaller than a length of the first slit in a long side direction thereof.

(8) The touch sensor according to the above (5), further including dummy line patterns and dummy connecting blocks disposed between the first sensing electrode and the second sensing electrode neighboring each other.

(9) The touch sensor according to the above (8), wherein dummy slits are defined by the dummy line patterns and the dummy connecting blocks.

(10) The touch sensor according to the above (5), wherein the first line pattern and the second line pattern extend in a saw-tooth shape or a wavy shape.

(11) The touch sensor according to the above (10), wherein at least one of the first connecting blocks is combined with an inflected portion of the first line pattern, and at least one of the second connecting blocks is combined with an inflected portion of the second line pattern.

(12) The touch sensor according to the above (1), further including a boundary pattern surrounding each of the first sensing electrode and the second sensing electrode.

(13) The touch sensor according to the above (12), wherein the boundary pattern extends in a wavy shape.

(14) The touch sensor according to the above (1), wherein the first slit extends in the first direction and the second slit extends in the second direction.

(15) An image display device including the touch sensor according to any one of the above (1) to (14).

In the touch sensor according to exemplary embodiments as described above, a sensing electrode may include a plurality of slits therein. A light scattering or diffraction may occur through the slits to prevent the sensing electrode from being viewed. An aperture ratio of the touch sensor may be also improved by the slits so that a high transmittance may be obtained.

A connecting portion and/or a bridge electrode for electrically connecting the sensing electrodes may have a solid structure. Thus, a channel resistance increase at a portion having a narrow width in a sensing electrode row or a sensing electrode column may be suppressed.

The sensing electrode may include line patterns defining the slits. The line pattern may extend in a wavy shape or a polygonal line shape. In this case, a moire phenomenon caused when the sensing electrodes overlap conductive patterns of a display panel under the touch sensor may be avoided.

The touch sensor may have improved optical, electrical and mechanical properties and may be effectively applied to an image display device of a high resolution.

BRIEF DESCRIPTION OF THE DRAWINGS

FIG. 15 is a schematic top plane view illustrating an image display device in accordance with an exemplary embodiment.

DETAILED DESCRIPTION

According to exemplary embodiments of the present invention, there is provided a touch sensor which may include first sensing electrodes and second sensing electrodes being arranged in directions crossing each other and including slits therein, bridge electrodes electrically connecting neighboring ones of the first sensing electrodes, and connecting portions electrically connecting neighboring ones of the second sensing electrodes, and may have high aperture ratio and transmittance and also have enhanced electrical property. An image display device including the touch sensor is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
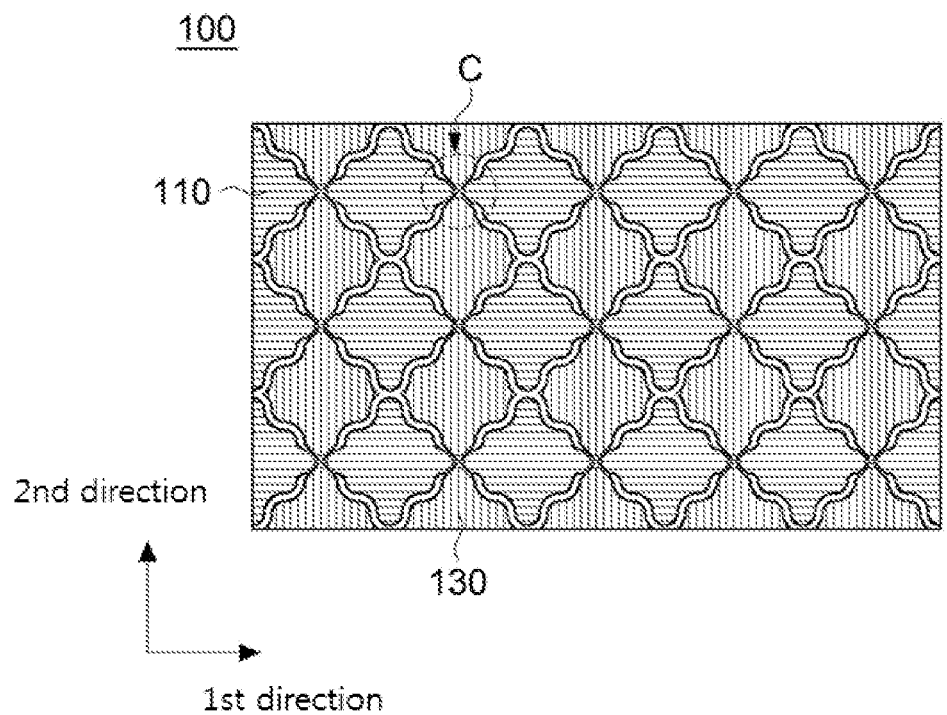
FIG. 1 is a schematic top plane view illustrating a touch sensor in accordance with an exemplary embodiment.
Figure 2:
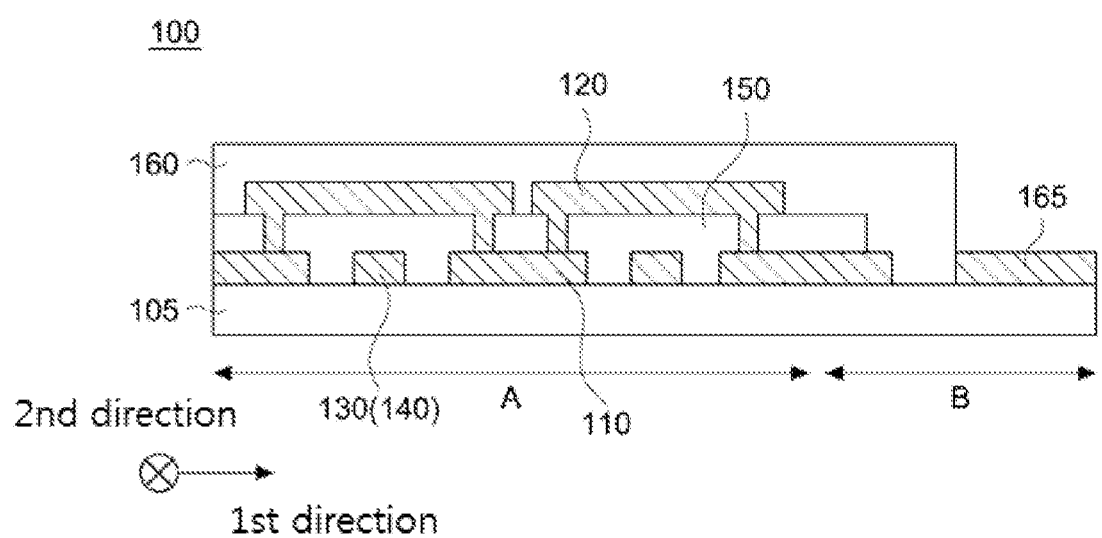
FIG. 2 is a schematic cross-sectional view illustrating a touch sensor in accordance with an exemplary embodiment.

FIG. 1 is a schematic top plane view illustrating a touch sensor in accordance with exemplary embodiments. FIG. 2 is a schematic cross-sectional view illustrating a touch sensor in accordance with exemplary embodiments.

Referring to FIGS. 1 and 2, a touch sensor 100 may include a substrate layer 105 and sensing electrode 110 and 130 arranged on the substrate layer 105.

The substrate layer 100 may include a film-type substrate that may serve as a base layer for forming the sensing electrodes 110 and 130, or an object or a workpiece on which the sensing electrodes 110 and 130 are formed. In some embodiments, the substrate layer 105 may include a display panel on which the sensing electrodes 110 and 130 may be directly formed.

For example, the substrate layer 105 may include a substrate or a film material commonly used in the touch sensor, e.g., glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate (polyallylate), polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

The sensing electrodes 110 and 130 may include first sensing electrodes 110 and second sensing electrodes 130.

The first sensing electrodes 110 may be arranged along a first direction (e.g., an X-axis direction) that may be parallel to a top surface of the substrate layer 105. In some embodiments, the first sensing electrodes 110 may include island-type unit electrodes physically separated from each other. In this case, the first sensing electrodes 110 neighboring in the first direction may be electrically connected to each other by the bridge electrode 120.

Accordingly, a first sensing electrode row extending in the first direction may be formed by a plurality of the first sensing electrodes 110. Further, a plurality of the first sensing electrode rows may be arranged along a second direction that may be parallel to the top surface of the substrate layer 105. The first and second directions may cross each other, e.g., to be perpendicular to each other.

The second sensing electrodes 130 may be arranged along the second direction (e.g., a Y-axis direction). Accordingly, a second sensing electrode column extending in the second direction may be formed by the second sensing electrodes 130. Further, a plurality of the second sensing electrode columns may be arranged along the first direction.

In some embodiments, the second sensing electrodes 130 neighboring in the second direction may be physically and electrically connected by a connecting portion 140. For example, the connecting portion 140 may be integrally formed with the second sensing electrodes 130 at the same level.

The sensing electrodes 110 and 130, and the bridge electrode 120 may include a metal, an alloy, a metal wire or a transparent conductive oxide.

For example, the sensing electrodes 110 and 130, and the bridge electrode 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)). These may be used alone or in a combination thereof.

The sensing electrodes 110 and 130, and the bridge electrode 120 may include the transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 130, and the bridge electrode 120 may include a stack structure including the transparent conductive oxide and the metal. For example, the sensing electrodes 110 and 130, and the bridge electrode 120 may have a triple-layered structure including a transparent conductive oxide layer—a metal layer—a transparent conductive oxide layer. In this case, a flexible property may be enhanced by the metal layer, and a resistance may be reduced to increase a signal transfer speed. Further, an anti-corrosion property and a transmittance may be improved by the transparent conductive oxide layer.

As illustrated in FIG. 2, an insulation layer 150 may be formed on the substrate layer 105 to at least partially cover the sensing electrodes 110 and 130. In exemplary embodiments, the insulation layer 150 may be formed at an intersection area of the first sensing electrode 110 and the second sensing electrode 130 to cover the connecting portion 140 of the second sensing electrode 130. The bridge electrode 120 may be formed on the insulation layer 150 to be connected to the first sensing electrodes 110 neighboring each other.

The insulation layer 150 may include an inorganic insulation material such as silicon oxide, silicon nitride, etc., or an organic insulation material such as acryl-based resin, a siloxane-based resin, etc.

As illustrated in FIG. 2, the touch sensor 100 may include a sensing region A and a wiring region B. The sensing electrodes 110 and 130, and the bridge electrode 120 may be disposed on the substrate layer 105 of the sensing region A. A pad 165 may be disposed on the substrate layer 105 of the wiring region B.

In exemplary embodiments, a trace may extend from each of the first sensing electrode row and the second sensing electrode column to be electrically connected to the pad 165 in the wiring region B.

Accordingly, a physical touch information introduced to the touch sensor 100 may be converted into an electrical signal generated from a capacitance difference by the first sensing electrode 110 and the second sensing electrode 130. The electrical signal may be transferred to a driving IC through the pad 165 so that a touch sensing may be implemented. The driving IC may be coupled to the pad 165 via, e.g., a flexible printed circuit board (FPCB).

A passivation layer 160 may protect the sensing electrodes 110 and 130, and the bridge electrode 120 on the sensing region A, and may also extend to the wiring region B. The passivation layer 160 may include an opening through which the pad 165 may be exposed.

The passivation layer 160 may include an inorganic insulation material such as silicon oxide, silicon nitride, etc., or an organic insulation material such as acryl-based resin, a siloxane-based resin, etc.

As illustrated in FIG. 1, the first sensing electrode 110 and the second sensing electrode 130 may be patterned into a predetermined shape.

In exemplary embodiments, 1, the first sensing electrode 110 and the second sensing electrode 130 may be patterned to have a boundary or peripheral of a wavy shape. Accordingly, a moire phenomenon which may occur when the sensing electrodes 110 and 130, and electrodes or wirings (e.g., a data line, a gate line, etc.) in a display panel disposed under the touch sensor 100 overlap each other may be avoided or reduced.

Figure 3:
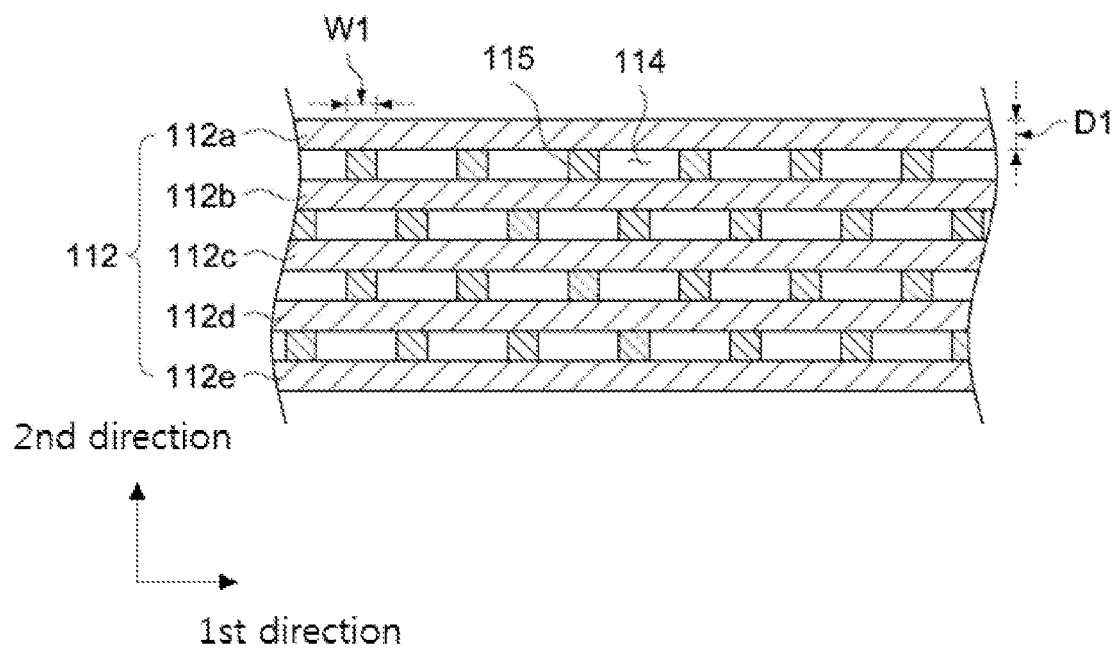
FIGS. 3 and 4 are schematic top plane views illustrating a pattern structure of a sensing electrode in accordance with an exemplary embodiment.
Figure 4:
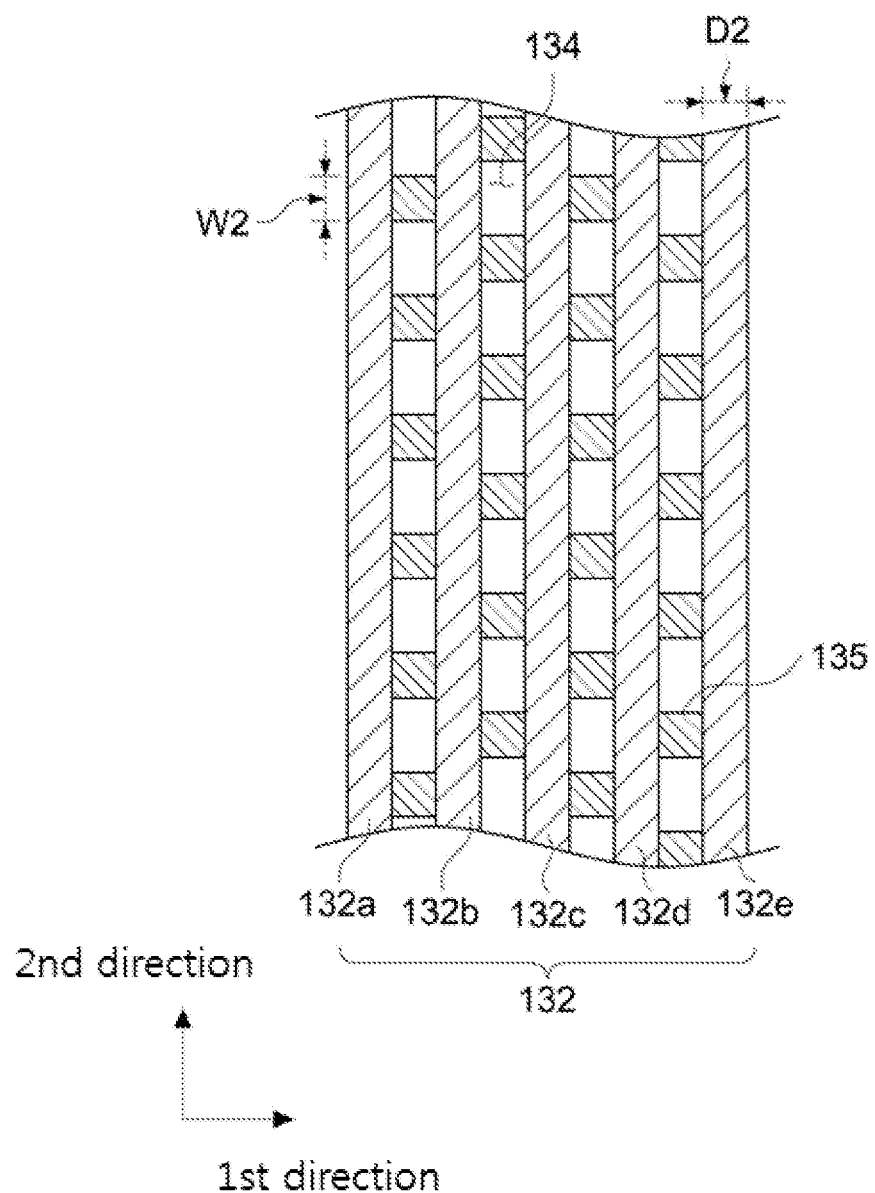

FIGS. 3 and 4 are schematic top plane views illustrating a pattern structure of a sensing electrode in accordance with exemplary embodiments. FIGS. 3 and 4 include partially enlarged views of a specific area in the sensing electrode.

For example, FIG. 3 illustrates a pattern structure of the first sensing electrode 110, and FIG. 4 illustrates a pattern structure of the second sensing electrode 130.

Referring to FIG. 3, the first sensing electrode 110 may include a first line pattern 112 and a first connecting block 115.

In exemplary embodiments, the first line pattern 112 may extend in the first direction, and a plurality of the first line patterns 112 (e.g., 112a, 112b, 112c, 112d, 112e . . . ) may be arranged along the second direction to be spaced apart from each other.

The first connecting blocks 115 may be arranged along the first direction to be spaced apart from each other between the first line patterns 112 neighboring in the second direction. Thus, the first line patterns 112 may be electrically connected to each other.

In exemplary embodiments, the first sensing electrode 110 may include a plurality of first slits 114. For example, the first slit 114 may be defined by a pair of the first line patterns 112 neighboring in the second direction, and a pair of the first connecting blocks 115 neighboring in the first direction.

The first slit 114 may have, e.g., a rectangular hole shape. In an embodiment, the first slit 114 may have the rectangular hole shape which includes a long side extending in the first direction and a short side extending in the second direction.

Referring to FIG. 4, the second sensing electrode 130 may include a second line pattern 132 and a second connecting block 135.

In exemplary embodiments, the second line pattern 132 may extend in the second direction, and a plurality of the second line patterns 132 (e.g., 132a, 132b, 132c, 132d, 132e . . . ) may be arranged along the first direction to be spaced apart from each other.

The second connecting blocks 135 may be arranged along the second direction to be spaced apart from each other between the second line patterns 132 neighboring in the first direction. Thus, the second line patterns 132 may be electrically connected to each other.

In exemplary embodiments, the second sensing electrode 130 may include a plurality of second slits 134. For example, the second slit 134 may be defined by a pair of the second line patterns 132 neighboring in the first direction, and a pair of the second connecting blocks 135 neighboring in the second direction.

The second slit 134 may have, e.g., a rectangular hole shape. In an embodiment, the second slit 134 may have the rectangular hole shape which includes a long side extending in the second direction and a short side extending in the first direction.

As described above, the line patterns may extend in the same direction as an extending direction of the sensing electrode. The first line pattern 112 included in the first sensing electrode 110 may extend in the first direction (e.g., the X-axis direction of a first sensing electrode row direction). The second line pattern 132 included in the second sensing electrode 130 may extend in the second direction (e.g., the Y-axis direction or a second sensing electrode column direction).

The line patterns 112 and 132 may be formed to have the same extending direction as that of the sensing electrodes 110 and 130 so that a signal transfer distance in the sensing electrodes 110 and 130 may be reduced and a signal interruption may be prevented.

Further, the line patterns 112 and 132 may be connected via the connecting blocks 115 and 135 so that a channel resistance increase due to a high aperture ratio may be suppressed. The connecting blocks 115 and 135 may also serve as supporting patterns of the line patterns 112 and 132 when a bending stress is applied to, e.g., a flexible display device including the touch sensor. Thus, mechanical reliability and durability of the sensing electrodes 110 and 130 may be enhanced.

As described above, each sensing electrode 110 and 130 may include the slits 114 and 134 therein so that the aperture ratio and transmittance of the touch sensor may be improved. Additionally, a light scattering or diffraction may occur at an inside or a periphery of the sensing electrode 110 and 130 due to the slits 114 and 134 so that the sensing electrodes 110 and 130 may be prevented from being viewed by a user.

In some embodiments, the slits 114 and 134 may be arranged in a zigzag or staggered configuration. As illustrated in FIG. 3, the first slits 114 may be arranged in a zigzag configuration to partially overlap each other along the second direction. As illustrated in FIG. 4, the second slits 134 may be arranged in a zigzag configuration to partially overlap each other along the first direction. Accordingly, the light scattering or diffraction through the slits 114 and 134 may be facilitated to reduce a light reflection by the sensing electrodes 110 and 130.

As illustrated in FIG. 3, a width (e.g., a width in the second direction) of the first line pattern 112 may be designated as D1 and a width (e.g., a width in the first direction) of the first connecting block 115 may be designated as W1. As illustrated in FIG. 4, a width (e.g., a width in the first direction) of the second line pattern 132 may be designated as D2 and a width (e.g., a width in the second direction) of the second connecting block 135 may be designated as W2.

In some embodiments, the width D1 of the first line pattern 112 and the width D2 of the second line pattern 132 may be different from each other. For example, if the touch sensor 100 is applied to an image display device having a relatively large length in the second direction (e.g., the Y-axis direction), a length of the second sensing electrode column may be greater than a length of the first sensing electrode row. Thus, a signal resistance in the second direction may be increased.

In this case, the width D2 of the second line pattern 132 may be adjusted to be greater than the width D1 of the first line pattern 112 so that a signal path or a current path in the second direction may be additionally achieved. Accordingly, a resistance difference between the X-axis direction and the Y-axis direction may be reduced.

Further, the width W2 of the second connecting block 135 may be greater than the width W1 of the first connecting block 115. In this case, a length (e.g., a length in the second direction) of the second slit 134 may be smaller than a length (e.g., a length in the first direction) of the first slit 114. Accordingly, the current path of the second sensing electrode 130 may be also increased through the second connecting block 135.

In some embodiments, the width D1 of the first line pattern 112 and the width D2 of the second line pattern 132 may be the same. The width W1 of the first connecting block 115 and the width W2 of the second connecting block 135 may be also the same. In this case, a difference of an electrode pattern shape in the touch sensor 100 may be decreased so that electrode patterns may be prevented from being viewed and an optical deviation may be suppressed.

In some embodiments, the widths D1 and D2 of the first line pattern 112 and the second line pattern 132 may be adjusted in a range from about 10 μm to about 30 μm. For example, the widths of the line patterns 112 and 132 may be increased relatively to a line width of a mesh pattern in a commonly known touch sensing electrode while forming the slits 114 and 134 in the sensing electrodes 110 and 130 so that a channel resistance may be reduced and the aperture ratio may be increased.

Figure 5:
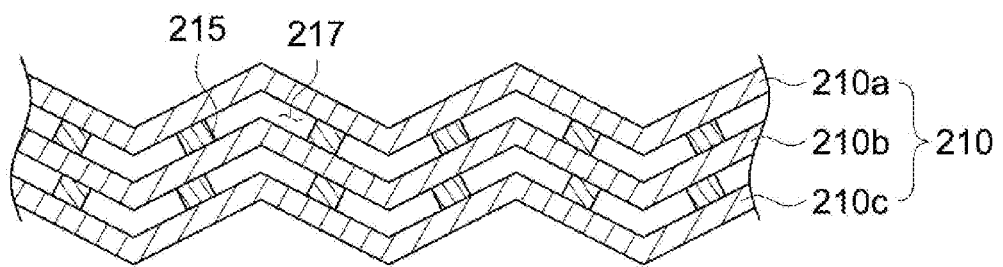
FIGS. 5 and 6 are schematic top plane views illustrating pattern structures of a sensing electrode in accordance with some exemplary embodiments.
Figure 6:
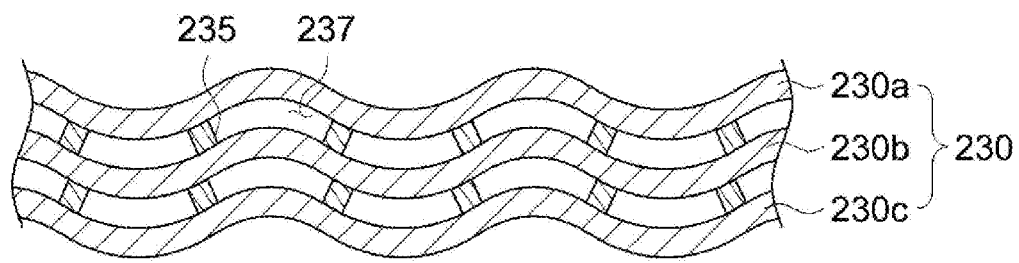

FIGS. 5 and 6 are schematic top plane views illustrating pattern structures of a sensing electrode in accordance with some exemplary embodiments.

Referring to FIG. 5, line patterns 210 (i.e., 210a, 210b, 210c . . . ) may extend in a saw-tooth shape including a plurality of infected portions. Further, connecting blocks 215 may be arranged to connect the line patterns 210 neighboring each other.

A slit 217 may be defined by the neighboring line patterns 210 and the neighboring connecting blocks 215. For example, the slit 217 may have a bracket shape.

Referring to FIG. 6, line patterns 230 (i.e., 230a, 230b, 230c . . . ) may extend in a substantially wavy shape. Further, connecting blocks 235 may be arranged to connect the line patterns 230 neighboring each other.

A slit 237 may be defined by the neighboring line patterns 230 and the neighboring connecting blocks 235. For example, the slit 237 may have a curved hole shape.

The line patterns 210 and 230 may extend in the same direction as that of a sensing electrode row or a sensing electrode column and may have a saw-tooth shape or a wavy shape. For example, if the line pattern 210 and 230 is included in the first sensing electrode 110, the line pattern 210 and 230 may extend in the first direction. If the line pattern 210 and 230 is included in the second sensing electrode 130, the line pattern 210 and 230 may extend in the second direction.

Additionally, the shape of the line pattern 210 and 230 may be modified from a linear shape so that the moire phenomenon caused by an overlap with electrodes or wirings in a display panel may be more effectively prevented.

Figure 7:
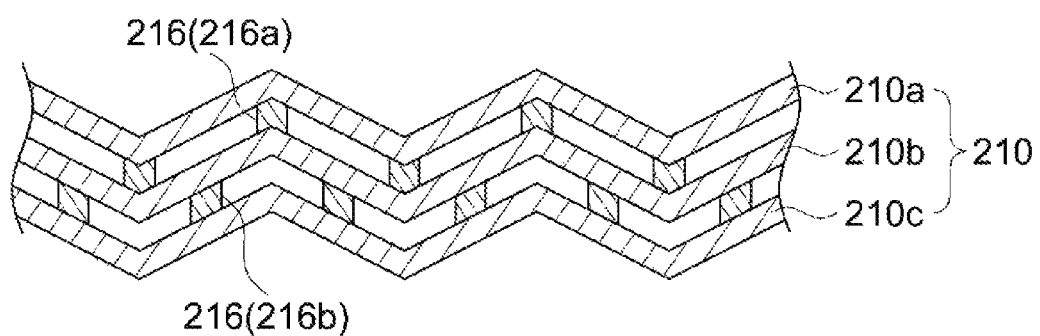
FIGS. 7 and 8 are schematic top plane views illustrating pattern structures of a sensing electrode in accordance with some exemplary embodiments.
Figure 8:
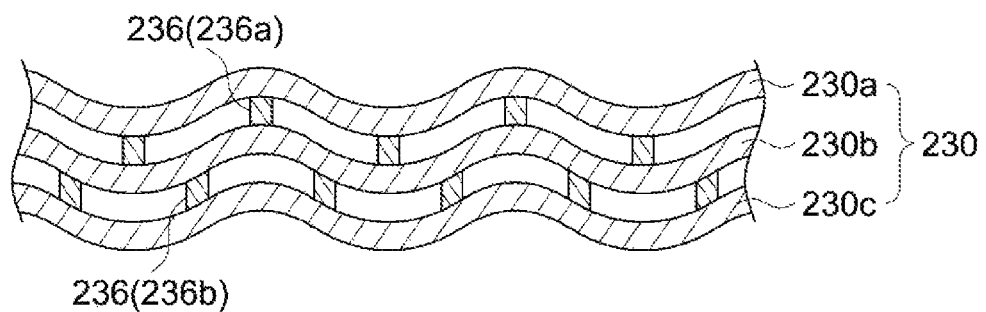

FIGS. 7 and 8 are schematic top plane views illustrating pattern structures of a sensing electrode in accordance with some exemplary embodiments.

Referring to FIG. 7, in a sensing electrode including the line pattern 210 of a substantially saw-tooth shape, a connecting block 216 may include a first connecting block 216a and a second connecting block 216b.

In exemplary embodiments, the first connecting block 216a may be combined with an infected portion, e.g., a bent portion of the line pattern 210. The second connecting block 216b may be combined with an extension portion of the line pattern 210 between the neighboring bent portions.

Referring to FIG. 8, in a sensing electrode including the line pattern 230 of a substantially wavy shape, a connecting block 236 may include a first connecting block 236a and a second connecting block 236b.

In exemplary embodiments, the first connecting block 236a may be combined with an inflected portion, e.g., a convex portion or a concave portion of the line pattern 230. The second connecting block 236b may be combined with an extension portion of the line pattern 230 between the convex portion and the concave portion neighboring each other.

As described above, the connecting blocks 216 and 236 may be dispersed throughout the inflected portions and the extension portions of the line patterns 210 and 230, so that the slits 210 and 230 may be stably maintained when being bent or folded. Additionally, areas in which the connecting portions 216 and 236 are distributed may be expanded so that the moire phenomenon may be further prevented. An electrode shape deviation at the convex portion and the concave portion may be also decreased by the connecting blocks 216 and 236 so that the sensing electrodes may be more effectively prevented from being viewed.

Figure 9:
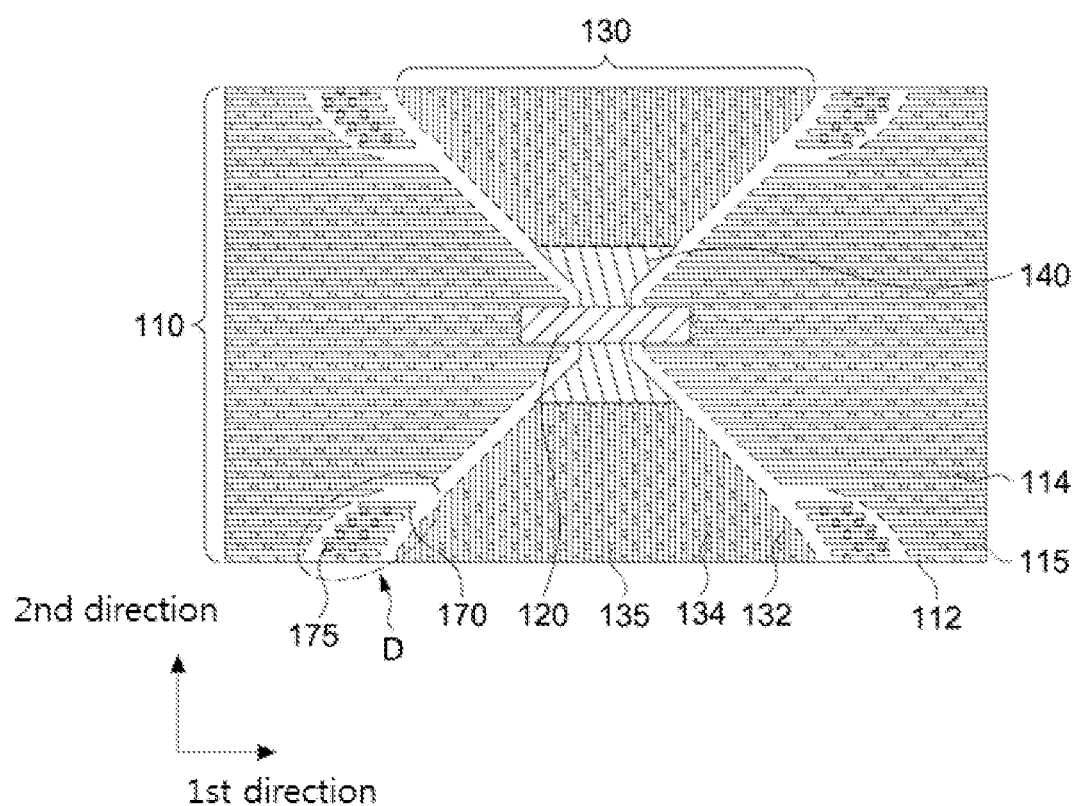
FIGS. 9 and 10 are partially enlarged views illustrating touch sensors in accordance with some exemplary embodiments.
Figure 10:
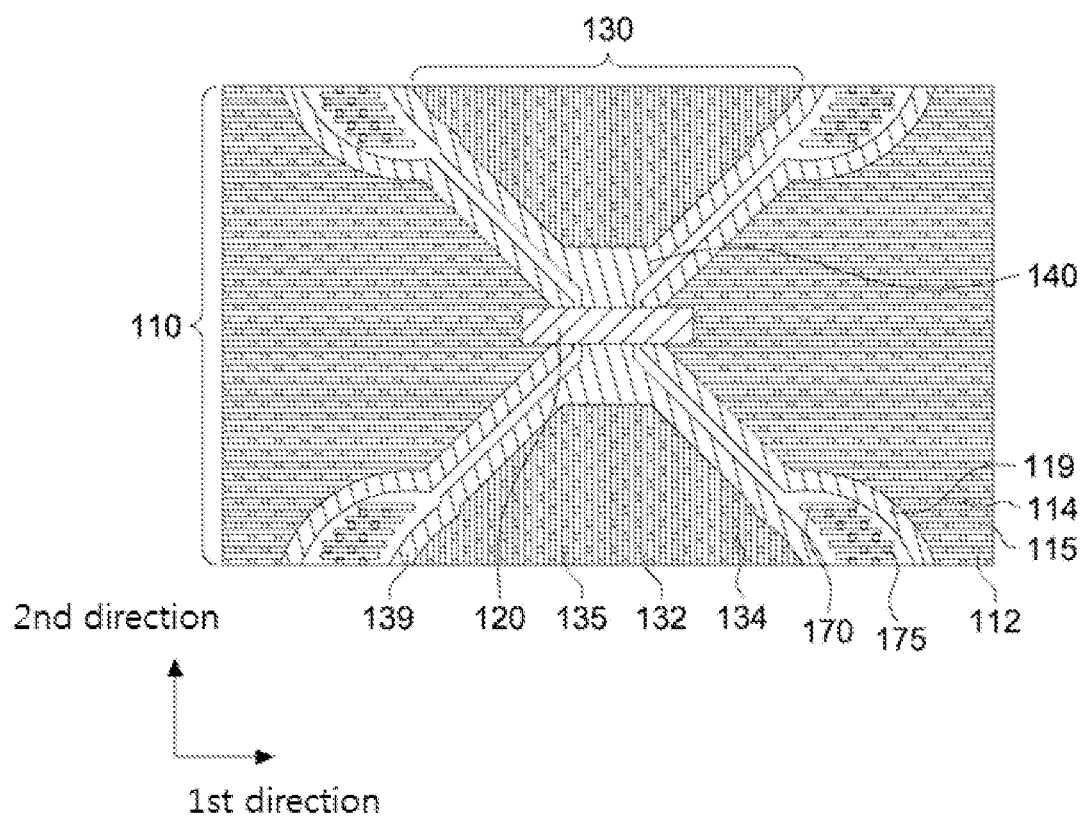

FIGS. 9 and 10 are partially enlarged views illustrating touch sensors in accordance with some exemplary embodiments. For example, FIGS. 9 and 10 are enlarged views of a region C designated in FIG. 1.

Referring to FIG. 9, as described with reference to FIGS. 3 and 4, the first line pattern 112 extending in the first direction may be formed in the first sensing electrode 110 arranged along the first direction. The first connecting blocks 115 may be arranged between the neighboring first line patterns 112. The first slits 114 may be formed in a zigzag configuration in the first sensing electrode 110.

The second line pattern 132 extending in the second direction may be formed in the second sensing electrode 130 arranged along the second direction. The second connecting blocks 135 may be arranged between the neighboring second line patterns 132. The second slits 134 may be formed in a zigzag configuration in the second sensing electrode 130.

The neighboring first sensing electrodes 110 separated along the first direction may be electrically connected to each other via the bridge electrode 120. The second sensing electrodes 130 neighboring in the second direction may be merged with each other via the connecting portion 140.

In some embodiments, the connecting portion 140 and/or the bridge electrode 120 may not include a hollow space such as a slit or a hole. For example, the connecting portion 140 and/or the bridge electrode 120 may be provided as a solid pattern. In an embodiment, the connecting portion 140 may be a solid conductive pattern. Thus, a resistance increase at the connecting portion 140 and the bridge electrode 120 having relatively small widths may be prevented and a signal transfer efficiency may be enhanced.

In some embodiments, the connecting portion 140 and/or the bridge electrode 120 may include silts substantially the same as or similar to those included in the first sensing electrode 110 and the second sensing electrode 130. In this case, the aperture ratio and transmittance of the touch sensor may be additionally improved.

A separation region D may be defined between the first sensing electrode 110 and the second sensing electrode 130 neighboring each other. In some embodiments, dummy line patterns 170 may be arranged in the separation region D. In an embodiment, dummy connecting blocks 175 may be arranged between the dummy line patterns 170 neighboring each other. Accordingly, a dummy slit may be defined by the dummy line patterns 170 and the dummy connecting blocks 175.

The dummy slits similar to the slits in the sensing electrodes 110 and 130 may be formed in the separation region D so that locational differences of a refractive index and a light reflectivity may be reduced to prevent the electrodes from being viewed.

Referring to FIG. 10, boundary patterns 119 and 139 patterns may be formed at each peripheral portion of the sensing electrodes 110 and 130. In exemplary embodiments, a first boundary pattern 119 may be formed at a peripheral portion of the first sensing electrode 110, and a second boundary pattern 139 may be formed at a peripheral portion of the second sensing electrode 130.

The sensing electrodes 110 and 130 may be confined by the boundary patterns 119 and 139, and the boundary patterns 119 and 139 may be merged with or connected to end portions of the line patterns 112 and 132. Accordingly, a resistance increase or a resistance difference in the sensing electrodes 110 and 130 may be avoided or reduced.

In some embodiments, the bridge electrode 120 may contact the first boundary pattern 119 through a contact hole formed in the insulation layer 150 (see FIG. 2). Thus, a contact area of the bridge electrode 120 and the first sensing electrode 110 may be increased so that a channel resistance or a contact resistance may be reduced.

In some embodiments, the second boundary pattern 139 may be integral with the connecting portion 140 of the second sensing electrode 130 or may be formed as a unitary member with the connecting portion 140 of the second sensing electrode 130. Thus, a current path or an electrical signal path via the connecting portion may be substantially expanded.

As described with reference to FIG. 1, the boundary patterns 119 and 139 may extend in a wavy shape to surround the line patterns 112 and 132.

Figure 11:
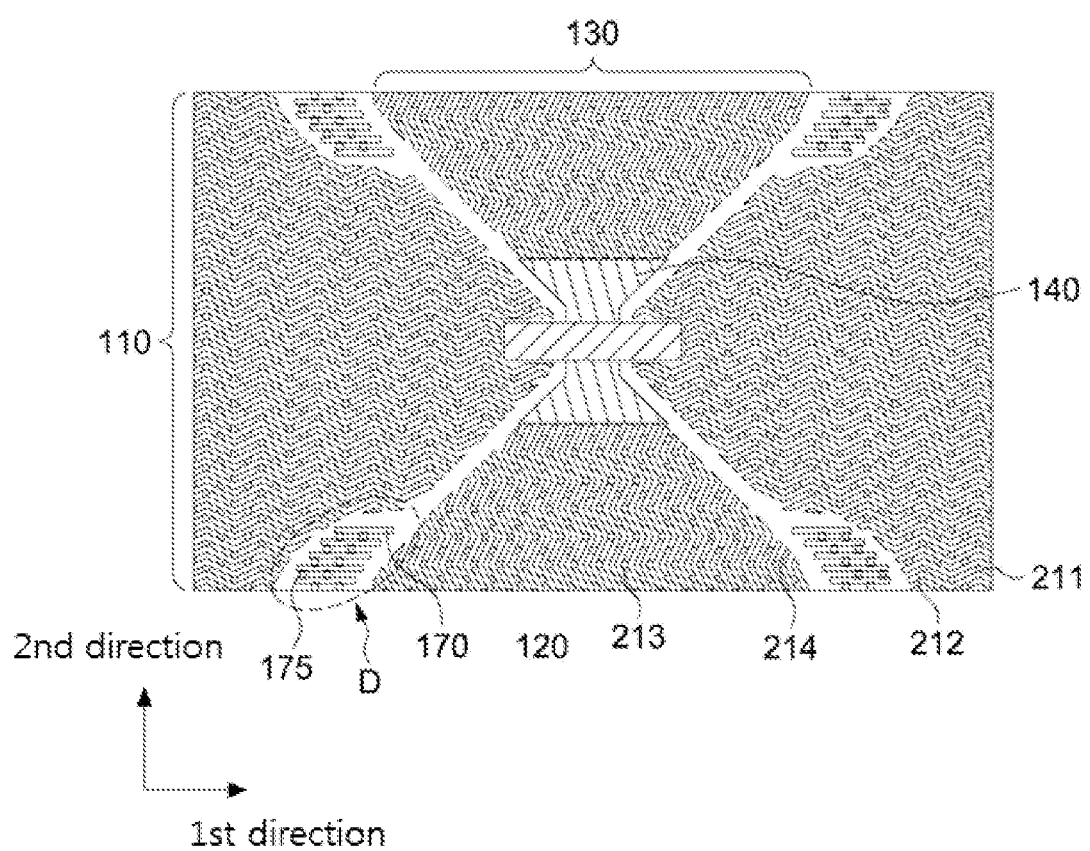
FIGS. 11 and 12 are partially enlarged views illustrating touch sensors in accordance with some exemplary embodiments.
Figure 12:
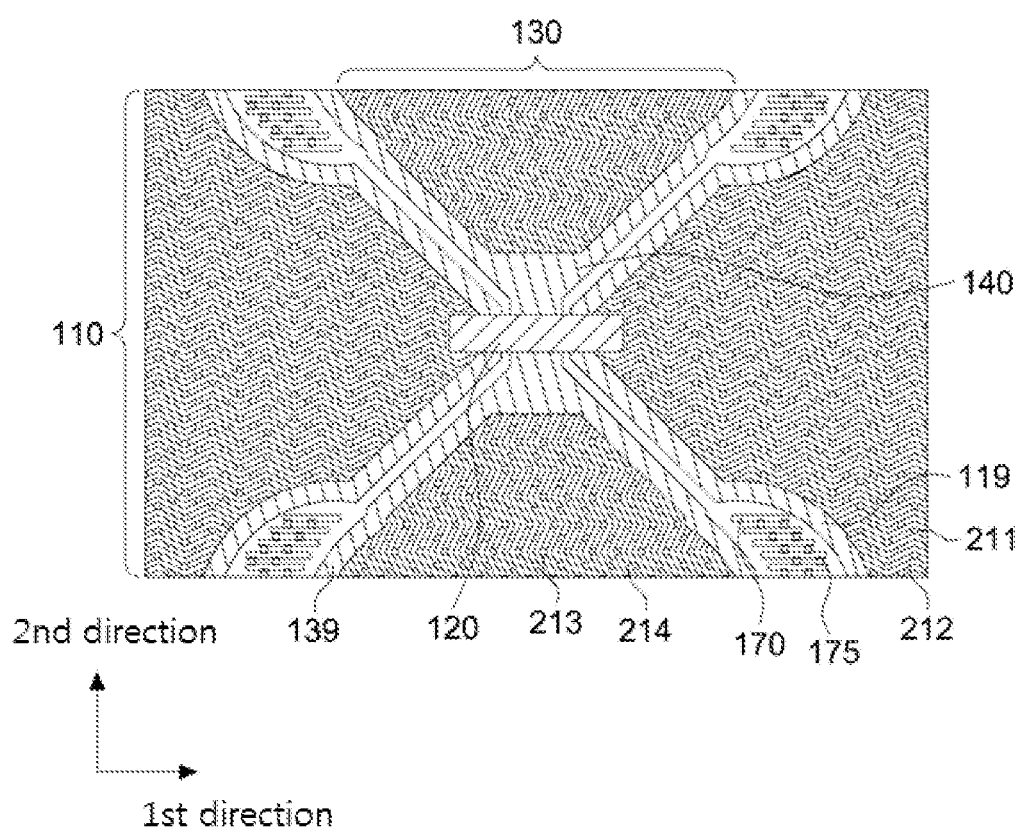

FIGS. 11 and 12 are partially enlarged views illustrating touch sensors in accordance with some exemplary embodiments.

The touch sensors illustrated in FIGS. 11 and 12 may have structures or constructions substantially the same as or similar to those of the touch sensors illustrated in FIGS. 9 and 10 except for a shape of a line pattern. Thus, detailed descriptions on repeated elements or structures are omitted herein.

Referring to FIG. 11, line patterns 212 and 214 may have a substantially saw-tooth shape as described with reference to FIGS. 5 and 7.

In some embodiments, connecting blocks 211 and 213 may be arranged between the line patterns 212 and 214 neighboring each other.

Referring to FIG. 12, peripheral portions of the first and second sensing electrodes 110 and 130 including the line patterns 212 and 214 of the saw-tooth shape may be confined or surrounded by the first and second boundary patterns 119 and 139.

Figure 13:
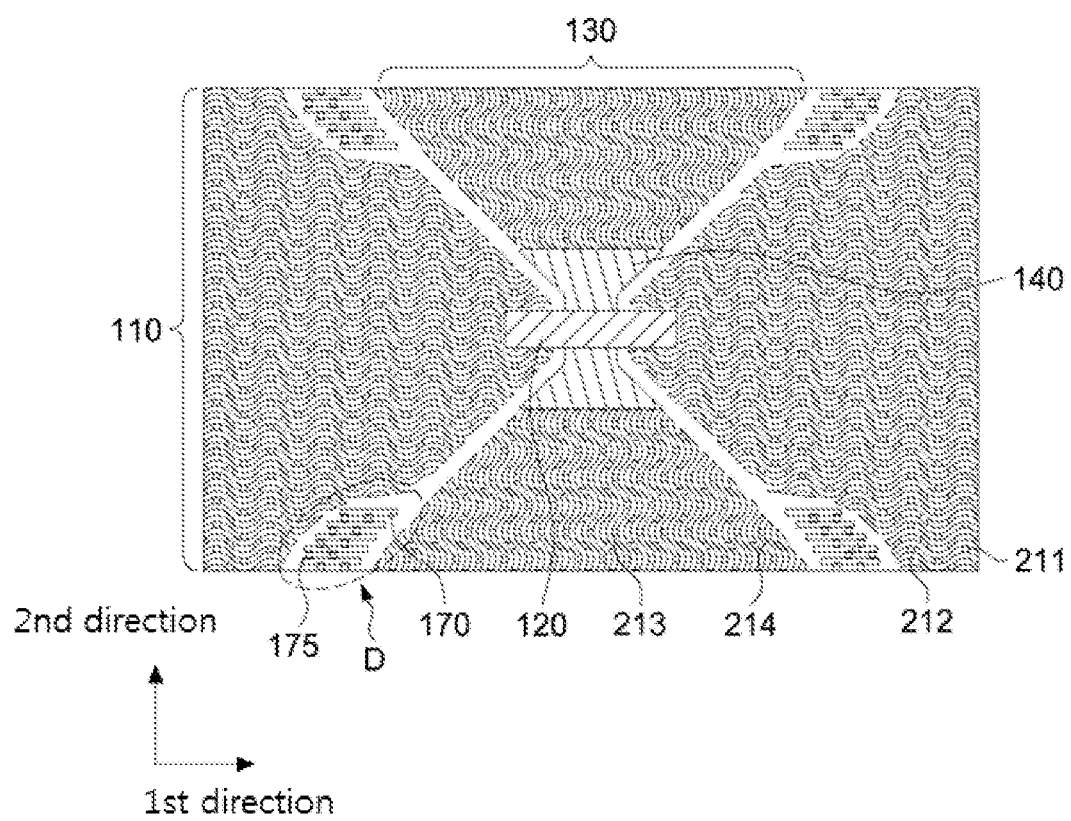
FIGS. 13 and 14 are partially enlarged views illustrating touch sensors in accordance with some exemplary embodiments.
Figure 14:
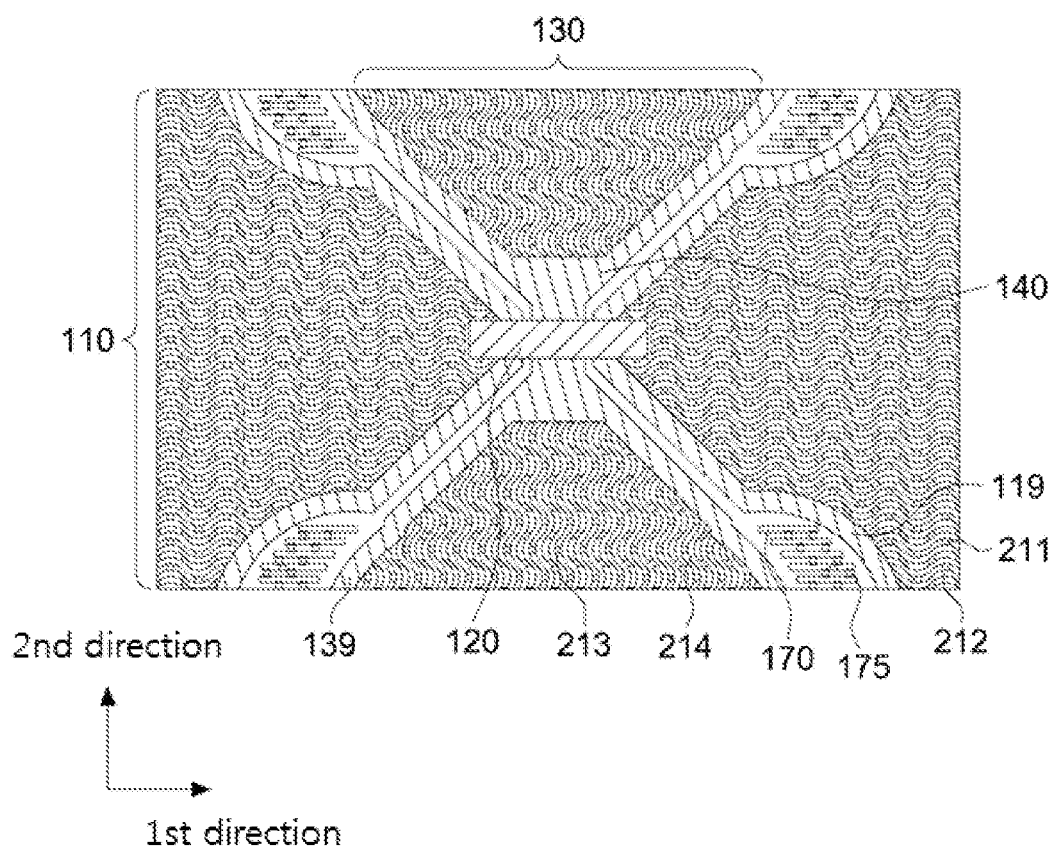

FIGS. 13 and 14 are partially enlarged views illustrating touch sensors in accordance with some exemplary embodiments.

The touch sensors illustrated in FIGS. 13 and 14 may have structures or constructions substantially the same as or similar to those of the touch sensors illustrated in FIGS. 9 and 10 except for a shape of a line pattern. Thus, detailed descriptions on repeated elements or structures are omitted herein.

Referring to FIG. 13, line patterns 212 and 214 may have a substantially wavy shape as described with reference to FIGS. 6 and 8.

In some embodiments, connecting blocks 211 and 213 may be arranged between the line patterns 212 and 214 neighboring each other.

Referring to FIG. 14, peripheral portions of the first and second sensing electrodes 110 and 130 including the line patterns 212 and 214 of the wavy shape may be confined or surrounded by the first and second boundary patterns 119 and 139.

As illustrated in FIGS. 11 to 14, slits may be modified from a linear shape so that a moire phenomenon caused by an overlap with conductive patterns included in a display panel disposed under the touch sensor may be reduced.

FIG. 15 is a schematic top plane view illustrating an image display device in accordance with exemplary embodiments. For example, FIG. 15 illustrates an outer shape including a window of the image display device.

Referring to FIG. 15, an image display device 300 may include a display region and a peripheral region 320.

In exemplary embodiments, the touch sensor may be disposed between a display panel and the window illustrated in FIG. 15. The sensing electrodes 110 and 130 may be disposed under the display region 310, and wirings and the pad 165 (see FIG. 2) may be disposed under the peripheral region 320. The peripheral region 320 may correspond to, e.g., a light-shielding area or a bezel area.

The display panel may include a pixel circuit including a thin layer transistor (TFT) and a pixel portion connected to the pixel circuit. The pixel circuit may include electrodes and wirings such as a data line, a scan line, a driving line, etc., regularly arranged according to an arrangement of the pixel portion.

As described above, the sensing electrodes 110 and 130 may include slits so that an electrode visibility and a moire phenomenon on the display region 310 may be effectively suppressed.

As illustrated in FIG. 15, the image display device 300 may have a relatively large length in the second direction (e.g., the Y-axis direction), and thus a length of the second sensing electrode column in the touch sensor may be greater than a length of the first sensing electrode row.

As described with reference to FIGS. 3 and 4, the width of the line pattern 132 included in the second sensing electrode 130 may be relatively increased so that a resistance deviation due to a length difference between the first and second sensing electrodes 110 and 130 may be reduced.

What is claimed is:

1. A touch sensor, comprising:
a substrate layer;
first sensing electrodes arranged on the substrate layer along a first direction parallel to a top surface of the substrate layer to be spaced apart from each other, the first sensing electrodes including first slits therein;
second sensing electrodes arranged on the substrate layer along a second direction parallel to a top surface of the substrate layer and crossing the first direction, the second sensing electrodes including second slits therein;
bridge electrodes electrically connecting neighboring ones of the first sensing electrodes along the first direction, the bridge electrodes having a solid conductive pattern structure; and
connecting portions which connect neighboring ones of the second sensing electrodes along the second direction, wherein the connecting portions are integrally connected to the second sensing electrodes such that the second slits are also formed in the connecting portions,
wherein the first slits extend in the first direction and the second slits extend in the second direction, and the first sensing electrodes and the second sensing electrodes are disposed at the same level such that the first slits and the second slits do not overlap each other;
the first slits are arranged in a zigzag configuration to overlap each other along the second direction, and the second slits are arranged in a zigzag configuration to overlap each other along the first direction;
the first sensing electrodes comprise first line patterns extending in the first direction and first connecting blocks connecting neighboring ones of the first line patterns;
the second sensing electrodes comprise second line patterns extending in the second direction and second connecting blocks connecting neighboring ones of the second line patterns;
the first line patterns and the second line patterns extend in a saw-tooth shape or a wavy shape;
the first connecting blocks comprise connecting blocks combined with inflected portions of the first line patterns and sub-second connecting blocks combined with extension portions of the first line patterns between neighboring inflected portions; and
the second connecting blocks comprise connecting blocks combined with inflected portions of the second line patterns and connecting blocks combined with extension portions of the second line patterns between neighboring inflected portions.

2. The touch sensor according to claim 1, further comprising an insulation layer covering the connecting portions, wherein the bridge electrodes are disposed on the insulation layer.

3. The touch sensor according to claim 1, wherein a length of the touch sensor in the second direction is greater than a length of the touch sensor in the first direction; and
a width of the second line pattern is greater than a width of the first line pattern.

4. The touch sensor according to claim 1, wherein a length of the touch sensor in the second direction is greater than a length of the touch sensor in the first direction; and
a length in the second direction of the second slit is smaller than a length in the first direction of the first slit.

5. The touch sensor according to claim 1, further comprising dummy line patterns and dummy connecting blocks disposed between the first sensing electrode and the second sensing electrode neighboring each other.

6. The touch sensor according to claim 5, wherein dummy slits are defined by the dummy line patterns and the dummy connecting blocks.

7. The touch sensor according to claim 1, further comprising boundary patterns surrounding each of the first sensing electrodes and the second sensing electrodes.

8. The touch sensor according to claim 7, wherein the boundary pattern extends in a wavy shape.

9. An image display device including the touch sensor according to claim 1.

10. A touch sensor, comprising:
a substrate layer;
first sensing electrodes arranged on the substrate layer along a first direction parallel to a top surface of the substrate layer to be spaced apart from each other, the first sensing electrodes including first slits therein;
second sensing electrodes arranged on the substrate layer along a second direction parallel to a top surface of the substrate layer and crossing the first direction, the second sensing electrodes including second slits therein;
bridge electrodes electrically connecting neighboring ones of the first sensing electrodes along the first direction; and connecting portions which connect neighboring ones of the second sensing electrodes along the second direction, wherein the bridge electrodes and the connecting portions have a solid conductive pattern structure;

wherein the first slits extend in the first direction and the second slits extend in the second direction, and the first sensing electrodes and the second sensing electrodes are disposed at the same level such that the first slits and the second slits do not overlap each other;

the first slits are arranged in a zigzag configuration to overlap each other along the second direction, and the second slits are arranged in a zigzag configuration to overlap each other along the first direction;

the first sensing electrodes comprise first line patterns extending in the first direction and first connecting blocks connecting neighboring ones of the first line patterns;

the second sensing electrodes comprise second line patterns extending in the second direction and second connecting blocks connecting neighboring ones of the second line patterns;

the first line patterns and the second line patterns extend in a saw-tooth shape or a wavy shape;

the first connecting blocks comprise connecting blocks combined with inflected portions of the first line patterns and connecting blocks combined with extension portions of the first line patterns between neighboring inflected portions; and the second connecting blocks comprise connecting blocks combined with inflected portions of the second line patterns and connecting blocks combined with extension portions of the second line patterns between neighboring inflected portions.

* * * * *